(12) United States Patent
Bleacher et al.

(10) Patent No.: US 12,174,730 B2
(45) Date of Patent: Dec. 24, 2024

(54) AUTOMATED TESTING OF ENTERPRISE RESOURCE PLANNING PROCESSES

(71) Applicant: Vertex, Inc., King of Prussia, PA (US)

(72) Inventors: Jeffrey J. Bleacher, Austin, TX (US); Susan M. Soo, Rancho Santa Fe, CA (US)

(73) Assignee: VERTEX, INC., King of Prussia, PA (US)

( * ) Notice: Subject to any disclaimer, the term of this patent is extended or adjusted under 35 U.S.C. 154(b) by 180 days.

(21) Appl. No.: 17/895,660

(22) Filed: Aug. 25, 2022

(65) Prior Publication Data

US 2024/0070052 A1    Feb. 29, 2024

(51) Int. Cl.
*G06F 11/36* (2006.01)

(52) U.S. Cl.
CPC ...... *G06F 11/3684* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 8,151,247 | B2 * | 4/2012 | Wefers | G06F 11/3688 717/124 |
| 9,201,774 | B1 * | 12/2015 | Cohen | G06F 8/30 |
| 2013/0191256 | A1 * | 7/2013 | Bleacher | G06Q 40/123 705/31 |
| 2018/0196843 | A1 * | 7/2018 | Bleacher | G06Q 40/123 |
| 2018/0285246 | A1 * | 10/2018 | Tuttle | G06F 11/3664 |
| 2022/0342802 | A1 * | 10/2022 | Elges | G06F 11/3664 |

OTHER PUBLICATIONS

Jianguo, "An Applicable Approach for Internal Control Testing in ERP", 2016, IEEE (Year: 2016).*

\* cited by examiner

*Primary Examiner* — Hossain M Morshed
(74) *Attorney, Agent, or Firm* — Alleman Hall & Tuttle LLP

(57) ABSTRACT

A computer system for automated testing of enterprise resource planning processes includes a computing device, a transaction database, and one or more processors. The one or more processors are configured to generate an editable test script template with a plurality of test fields, display the editable test script to a user, receive user input of an expected value for test criteria and values for test data points, and validate the test criteria. The processor is further configured to identify at least one historical electronic transaction record that contains source document values according to the entered test data points, and an existing value for the test criteria, populate the test script template with the test data points and the existing value for the test criteria, and generate a test report that indicates whether the existing value for the test criteria matches the expected value.

20 Claims, 8 Drawing Sheets

| Offst/Order | Field Name | Field Description |
|---|---|---|
| 10 | COMPANYCODE | Company Code |
| 20 | GL_ACCOUNT | GL Account |
| 30 | GL_ACCOUNT_DESC | GL Account Description |
| 40 | VENDOR | Vendor Number |
| 50 | VENDOR_NAME | Vendor Name |
| 60 | COSTCENTER | Cost Center |
| 70 | COSTCENTER_DESC | Cost Center Description |
| 80 | SHIPTOREGIO | Ship to Region |
| 90 | SHIPFROMREGIO | Ship from Region |
| 100 | PROD_CODE | Product Code |
| 110 | COSTCENTER_REG | Cost Center Region |

FIG. 2

| SCRIPT_ID | DESCRIPTION | EXP_TAX | EXP_TAX_CODE | GL_ACCOUNT_DESC | VENDOR_NAME | SHIPTO | PROD_CODE |
|---|---|---|---|---|---|---|---|
| VR_FI_LCQ_100 | Laptop used in Admin | T | I1 | | | CA | HARDWARE |
| VR_FI_LCQ_101 | Taxable direct pay in TX | T | U1 | | | TX | TPP_GOODS |
| VR_FI_LCQ_102 | Computer hardware in IL | T | I1 | | | IL | HARDWARE |
| VR_FI_LCQ_103 | Office supplies in SD | E | U2 | *OFFICE* | | SD | |
| VR_FI_LCQ_104 | Trucking services in SD | E | I1 | | *TRUCKING* | SD | SVC_INFO |
| VR_FI_LCQ_105 | Office rental in FL | E | U1 | | | FL | LEASE_RP |
| VR_FI_LCQ_106 | Raw materials in TN | E | I1 | | | TN | RAW_MAT |
| VR_FI_LCQ_107 | RP maintenance in TX | E | U1 | | | TX | REPAIR_RP |
| VR_FI_LCQ_108 | Services in CA | T | I1 | | *SERVICE* | CA | SVC_PROF |
| VR_FI_LCQ_109 | Software TPP delivery in CA | T | I1 | | | CA | SW_TPP |
| VR_FI_LCQ_110 | Janitorial services in TX | T | U1 | *JANITOR* | | TX | SVC_JANITR |

FIG. 3

| Ext Sct ID | Description | ST R | SrcDoTxjcd | Prod Code | G/L Acct Desc | SrcDocGL | SrcDocVen | Vendor Name |
|---|---|---|---|---|---|---|---|---|
| VR_FI_LCQ_100 | Laptop used in Admin | CA | 0503732200 | HARDWARE | | 476900 | 11005 | |
| VR_FI_LCQ_101 | Taxable direct pay in TX | TX | 4408523100 | TPP_GOODS | | 410001 | 11005 | |
| VR_FI_LCQ_102 | Computer hardware in IL | IL | 1403184110 | HARDWARE | | 476900 | 3425 | |
| VR_FI_LCQ_103 | Office supplies in SD | SD | 4209901800 | | *OFFICE* | 476000 | 1021 | |
| VR_FI_LCQ_104 | Trucking services in SD | SD | 4209901800 | SVC_INFO | | 417010 | 1005 | *TRUCKING* |
| VR_FI_LCQ_105 | Office rental in FL | FL | 1011514300 | LEASE_RP | | 47000 | 11005 | |
| VR_FI_LCQ_106 | Raw materials in TN | TN | 3306120101 | RAW_MAT | | 4000000 | 11005 | |
| VR_FI_LCQ_107 | RP maintenance in TX | TX | 4408523100 | REPAIR_RP | | 417027 | 11005 | |
| VR_FI_LCQ_108 | Services in CA | CA | 0503732200 | SVC_PROF | | 417010 | 3555 | |
| VR_FI_LCQ_109 | Software TPP delivery in CA | CA | 0503732200 | SW_TPP | | 410001 | 11005 | |
| VR_FI_LCQ_110 | Janitorial services in TX | TX | 4408523100 | SVC_JANITR | *JANITOR* | 417023 | 100224 | *SERVICE* |

FIG. 4

| SCRIPT_ID | DESCRIPTION | STATUS | EXP_TAX | EXP_TAX_CODE | TX | TAX | TAX_JUR. |
|---|---|---|---|---|---|---|---|
| VR_FI_LCQ_101 | Taxable direct pay in TX | PASS | T | T | T | U1 | 4408523100 |
| VR_FI_LCQ_102 | Computer hardware in IL | | T | I1 | T | I1 | 1403184110 |
| VR_FI_LCQ_103 | Office supplies in SD | | E | U2 | T | U2 | 4209901800 |
| VR_FI_LCQ_104 | Trucking services in SD | | E | I1 | E | I1 | 4209901800 |
| VR_FI_LCQ_106 | Raw materials in TN | | T | U1 | E | I1 | 3306120101 |
| VR_FI_LCQ_107 | RP maintenance in TX | | E | I1 | T | U1 | 4408523100 |
| VR_FI_LCQ_108 | Services in CA | | T | I1 | E | I1 | 0503732200 |
| VR_FI_LCQ_110 | Janitorial services in TX | FAIL | T | I1 | T | U1 | 4408523100 |
| VR_FI_LCQ_100 | Laptop used in Admin | | E | U1 | T | U2 | 0503732200 |
| VR_FI_LCQ_105 | Office rental in FL | | T | U1 | T | U1 | 3200100000 |
| VR_FI_LCQ_109 | Software TPP delivery in CA | | T | I1 | T | I2 | 0503732200 |

FIG. 5

| Type | Message Text |
|---|---|
| □ | THE PURCHASE ORDER DOCUMENT IS :4500017944 |
| □ | Standard PO created under the number 4500017944 |
| □ | Attempting to create GR |
| □ | Trying to enqueue the PO |
| ○ | GR creation failed for PO 4500017944. Check BAPI messages below. |
| ○ | Posting only possible in periods of 2020/02 and 2020/01 in company code 3000 |
| □ | GR creation failed for PO 4500017944 |
| □ | Attempting to create invoice for PO 4500017944 |
| □ | Creating invoice |
| □ | Invoice creation for PO 4500017944 failed. Check BAPI messages below. |
| ○ | Allowed posting periods: 02 2020 / 01 2020 / 12 2019 for company code 3000 and date 03/18/2020 |

FIG. 6

AUTOMATED TESTING OF ENTERPRISE RESOURCE PLANNING PROCESSES

BACKGROUND

Implementing or upgrading an enterprise resource planning system requires extensive testing to ensure business transactions are processed accurately, particularly when the enterprise resource planning system is integrated with an external system for calculating transaction taxes. Calculating sales tax, use tax, value added tax, and goods and services tax requires an extended set of test cases to cover the different taxing variables, as many tax departments need to test different jurisdiction rules, various products and services, customers, vendors, and a wide range of special rules and exemptions. Assembling the appropriate configured scripts to test such business transactions and/or tax scenarios within an enterprise resource planning computing system environment can be complex and time consuming.

SUMMARY

To facilitate the above process, a computer system for automated testing of enterprise resource planning processes is provided. According to one aspect, the computer system includes a computing device including a display, a transaction database, and one or more processors. The transaction database includes at least one historical electronic transaction record and data appropriately configured to create transactions. The one or more processors are configured to execute the testing program using portions of associated memory to generate an editable test script template for testing the enterprise resource planning processes, and display the editable test script to a user via a graphical user interface. The editable test script template has a plurality of test fields, which include test fields for test criteria for evaluation and test fields for test data points. The one or more processors are further configured to receive user input of an expected value for one or more test criteria for evaluation and a value for one or more test data points, and validate the one or more test criteria input by the user. The one or more processors are further configured to identify at least one historical electronic transaction record that contains source document values according to the entered test data points, and an existing value for the one or more test criteria, and populate the test script template with the source document values and the existing value for the one or more test criteria from the identified at least one historical electronic transaction record. The one or more processors are further configured to generate a test report that indicates whether the existing value for the one or more test criteria matches the expected value. Other aspects of the system are described below.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows example test data points for testing enterprise resource planning processes using the computing system of FIG. 1.

FIG. 3 shows an example editable test script template for testing enterprise resource planning processes using the computing system of FIG. 1.

FIG. 4 shows an example populated test script template for testing enterprise resource planning processes using the computing system of FIG. 1.

FIG. 5 shows an example test report document generated during testing enterprise resource planning processes using the computing system of FIG. 1.

FIG. 6 shows an example log of system messages during testing enterprise resource planning processes using the computing system of FIG. 1.

DETAILED DESCRIPTION

When implementing or upgrading an enterprise resource planning (ERP) system, testing processes such as Procure-to-Pay and Order-to-Cash often involves manual input and is very time-consuming. When the ERP system is integrated with tax calculation software, testing must be performed to ensure that business transactions can be processed and have the appropriate outcomes for legislative requirements, such as indirect taxes, including sales tax, use tax, value added tax (VAT), and goods and services tax (GST). Conventional approaches to testing ERP processes typically involve defining a test scenario, manually collecting data required to create a successful transaction, manually creating the purchase order, goods receipt, logistics invoice verification (LIV), sales order, delivery, billing, and credit/debit memo documents and reviewing each of the resulting test documents to manually compare actual and expected results, including tax values. When the test scenario does not match the expected result, the root cause must be determined and solved, and the testing process repeated. As such, assembling the appropriate configured data to test a business transaction or tax scenario can be complex and time consuming, which may result in too little testing and increased risk of inaccurate documents.

Figure 1:
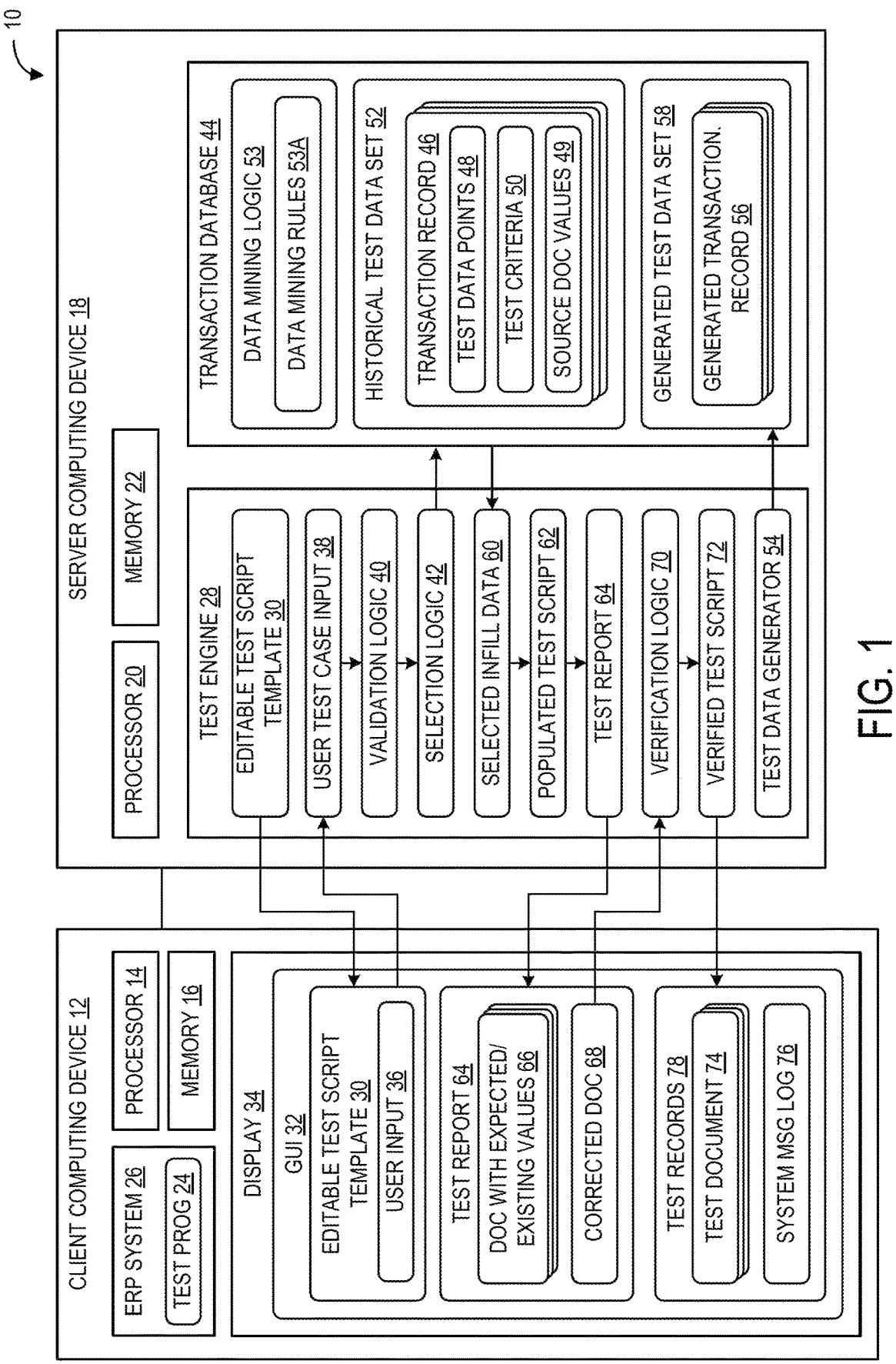
FIG. 1 is a general schematic diagram of a computing system for automated testing of enterprise resource planning processes according to an embodiment of the present disclosure.

As schematically illustrated in FIG. 1, to address the above identified issues, a computing system 10 for automated testing of enterprise resource planning processes is provided. The computing system 10 is illustrated as comprising a first computing device 12 including a processor 14 and memory 16, and a second computing device 18 including a processor 20 and memory 22. The illustrated implementation is exemplary in nature, and other configurations are possible. In the description of FIG. 1 below, the first computing device will be described as a client computing device 12 and the second computing device will be described as a server computing device 18, and respective functions carried out at each device will be described. It will be appreciated that in other configurations, the first computing device could be a computing device other than client computing device 12. In some configurations, the computing system 10 may include a single computing device that carries out the salient functions of both the client computing device 12 and server computing device 18. In other alternative configurations, functions described as being carried out at the server computing device 18 may alternatively be carried out at the client computing device 12 and vice versa.

Continuing with FIG. 1, the processor 14 of the client computing device 12 is configured to execute a testing program 24 for the enterprise resource planning processes using portions of associated memory 16. The testing program 24 may be installed in an ERP system 26 on the client computing device 12, which is in communication with the server computer device 18. Upon initiation of the testing program 24, the processor 20 on the server computing device 18 is configured to, at a test engine 28 hosted on the server computing device 18, generate an editable test script template 30 for testing the ERP processes. The editable test script template 30 is transmitted to the client computing device 12 and displayed to a user via a graphical user interface (GUI) 32 on the display 34.

As described in detail below with reference to FIGS. 2 and 3, the editable test script template 30 has a plurality of test fields, including test fields for test criteria for evaluation and test fields for test data points. For example, the one or more test criteria may be taxability, a tax rate, a tax code, and/or a tax jurisdiction code. Additionally or alternatively, the test program 24 may be configured for use with non-tax test criteria, such as a deliverable date, whether a product is in stock, and/or number of units of a product in stock, for example. Test data points may be specified by the user in the editable test script template 30, and may include values such as company code, vendor name, vendor number, product code, and the like. The editable test script template 30 is configured to receive user input 36 of an expected value for one or more test criteria and a value for one or more test data points. As described below with reference to FIG. 3, the test program 24 is configured to run when values are input for a minimal number of the test data points, and actual ERP data is not required. When the user finishes inputting the expected value for the test criteria and the value for one or more test data points, the editable test script template 30 is transmitted to the server computing device 18.

The editable test script template 30 is received at the test engine 28 as user test case input 38. The test criteria input by the user are checked and validated via validation logic 40 to ensure they fall within the limits for valid testing scenarios. As described above, the user may input values for a minimal number of the test data points 48, thereby leaving some or most of the test fields blank. Based on the test data points 48, selection logic 42 is configured to send a request to a transaction database 44 to identify at least one historical electronic transaction record 46 included in the transaction database 44 that contains source document values 49 according to the entered test data points, and an existing value for the one or more test criteria 50.

In some implementations, at least one historical electronic transaction record 46 is one of a plurality of historical electronic transaction records 46 stored at the transaction database 44, and each of the plurality of historical electronic transaction records 46 contains source document values 49 according to the entered test data points 48. As such, together, the plurality of historical electronic transaction records 46 may comprise a historical test data set 52. The historical test data set 52 may include, for example, master data and configurations used in previous transactions.

In some implementations, the source document values 49 are identified via data mining. Data mining logic 53 may define data mining rules 53A, which are executed by the processor 20 to mine the at least one historical electronic transaction record 46 and/or the historical test data set 52 for source document values 49 according to the entered test data points, and an existing value for the one or more test criteria 50. The test script template 30 may be populated with the source document values and the existing value for the one or more test criteria generated from data mined from at least one historical electronic transaction record 46 and/or the historical test data set 52. It will be appreciated that data mining includes performing a search, identifying one or more documents that match the search criteria, and extracting values from the identified one or more documents according to one or more data mining rules 53A.

In some implementations, the source document values 49 in the at least one historical transaction record 46 do not match the entered test data points. In this implementation, the at least one historical transaction record 46 that includes source document values 49 that best match the entered test data points is identified, and master data and configurations that have the desired attributes are identified in other historical electronic transaction records in the historical test data set 52 and used to complete population of the editable test script template 30 with source document values 49.

Alternatively, in some use-case scenarios, the at least one historical electronic transaction record 46 may lack sufficient data to populate the source document values 49. When at least one historical electronic transaction record that contains source document values 49 according to the entered test data points 48, and an existing value for the one or more test criteria 50 cannot be identified, the processor 20 is configured to generate data including source document values 49 according to the entered test data points 48, and the existing value for the one or more test criteria 50 via a test data generator 54 included in the test engine 28. The generated data may be configured as one or more generated transaction records 56, which are stored at the transaction database 44 as a generated test data set 58.

When source document values 49 and an existing value for the one or more test criteria 50 have been determined, the data is transmitted to the test engine 28 as selected infill data 60. As described in detail below with reference to FIG. 4, the selected infill data 60 is used to populate the test script template 30 with the source document values 49 and the existing value for the one or more test criteria 50, and create a populated test script 62. The populated test script 62 is used to generate a test report 64, which is displayed to the user via the GUI 32 on the display 34 of the client computing device 12. The test report 64 includes one or more documents 66 that indicate whether the existing value for the one or more test criteria 50 matches the expected value, as described in detail below with reference to FIG. 5. When the existing value is different from the expected value for the one or more test criteria 50, the processor 14 is configured to receive user input to correct the existing value for the one or more test criteria 50 and generate a corrected document 68. In response to receiving the user input to correct the existing value, the corrected document 68 is transmitted to the test engine 28 on the server computing device 18 where it is passed through verification logic 70 to verify the corrected existing value for one or more test criteria 50 matches the expected value.

Upon verification, a verified test script 72 is transmitted to the client computing device 12, and the processor 14 is configured to create test documents 74 based on the verified test script 72. The test documents 74 the test documents include at least one of a purchase order, financial accounting invoice, and sales order, customer invoice (billing document) and each test document 74 may be created in different modes to simulate at least one of manually entered documents, business application programming interface documents, intermediate documents, and collective billing documents. As described below with reference to FIG. 6., the processor 14 is further configured to generate a system messages log 76 that captures system messages during execution of the test program 24. The system messages log 76 displays message text recorded at various stages of the test program 24, from receiving user input 36 in the editable test script template 30 to creating test documents 74 based on the verified test script 72, and additionally indicates whether each stage was successfully executed. The test documents 74 and system messages log 76 may be collectively stored as test records 78.

FIG. 2 shows example test data points 48 that may be specified by the user in the editable test script template 30. As shown, the test data point 48 may include values such as company code, general ledger (GL) account, GL account description, vendor, vendor name, cost center, cost center description, ship to region, ship from region, product code, and cost center region, for example. It will be appreciated that other values not shown may be specified by the user for test data points 48 for testing ERP processes. The input fields for the test data points 48 may include names and descriptions, and the fields be configured to be offset or ordered.

FIG. 3 shows an example editable test script template 30 for testing ERP processes. As described above, the editable test script template 30 has a plurality of test fields, including test fields for test criteria 50 for evaluation and test fields for test data points 48. A column for script identification and description are also included. In the illustrated example, the test criteria 50 are the taxability 50A and tax code 50B. The expected taxability can be either taxable (T) or exempt (E), and the expected tax code is one of I1, U1, and U2. The example test data points 48 are GL account description 48A, vendor name 48B, ship to region 48C, and product code 48D. In addition to values for the ship to region, only values for the product code are entered for script ID numbers 100-102 and 105-109, only the value for GL account description is entered for script ID number 103, script ID number 104 has values for vendor name and product code, and script ID number 109 has values for GL all available test data points. As described above, the test program 24 is configured to run when values are input for a minimal number of the test data points 48.

FIG. 4 shows an example populated test script 62 for testing the enterprise resource planning processes using the computing system of FIG. 1. As described above, selection logic 42 is configured to send a request to a transaction database 44 to identify at least one historical electronic transaction record 46, or one or more generated transaction records 56, that contains source document values 49 according to the entered test data points 48, and an existing value for the one or more test criteria 50. In the illustrated example, the script ID numbers, description, and test data points 48 are shown in the populated test script 62, as well as newly populated source document values 49 for source document tax jurisdiction code 49A, source document general ledger 49B, and source document vendor code 49C. The populated test script 62 is subsequently used to generate a test report 64. The test report 64 may include one or more documents 66 that indicate whether the existing value for the one or more test criteria 50 matches the expected value FIG. 5 shows an example test report document 66 generated from the populated test script 62 of FIG. 6. As illustrated, the example test report document 66 includes the script ID numbers, description, expected values for taxability 50A and tax code 50B, existing values for taxability 51A and tax code 51B, tax jurisdiction 49A, and the test criteria status, i.e., pass or fail. In the test report document 66, the script ID numbers are offset according to the test criteria status. As shown, the existing values for tax code 51B for script ID numbers 100 and 109 did not match the expected values for tax code 50B, and the existing taxability value 51A did not match the expected taxability value 50A for script ID number 105. The mismatched values in the existing values are highlighted. As described above, when the existing value 51 is different from the expected value for the test criteria 50, the processor 14 is configured to receive user input to correct the existing value 51 for the test criteria 50 and generate a corrected document 68. In the embodiments described herein, the test report document 66 is evaluated via deterministic logic. However, it will be appreciated that the test report document 66 may be processed via a machine learning model to determine the existing values match respective expected values in the test report document 66.

FIG. 6 shows an example log of system messages during execution of the test program 24. As illustrated, the system messages log 76 displays message text recorded at various stages of the test program 24 and indicates whether each stage was successfully executed. In the example of FIG. 6, the goods receipt (GR) creation and invoice creation failed for the specified purchase order (PO). The user may be directed to check messages related to the Business Application Programming Interface (BAPI) to determine the cause of the failure.

Figure 7:
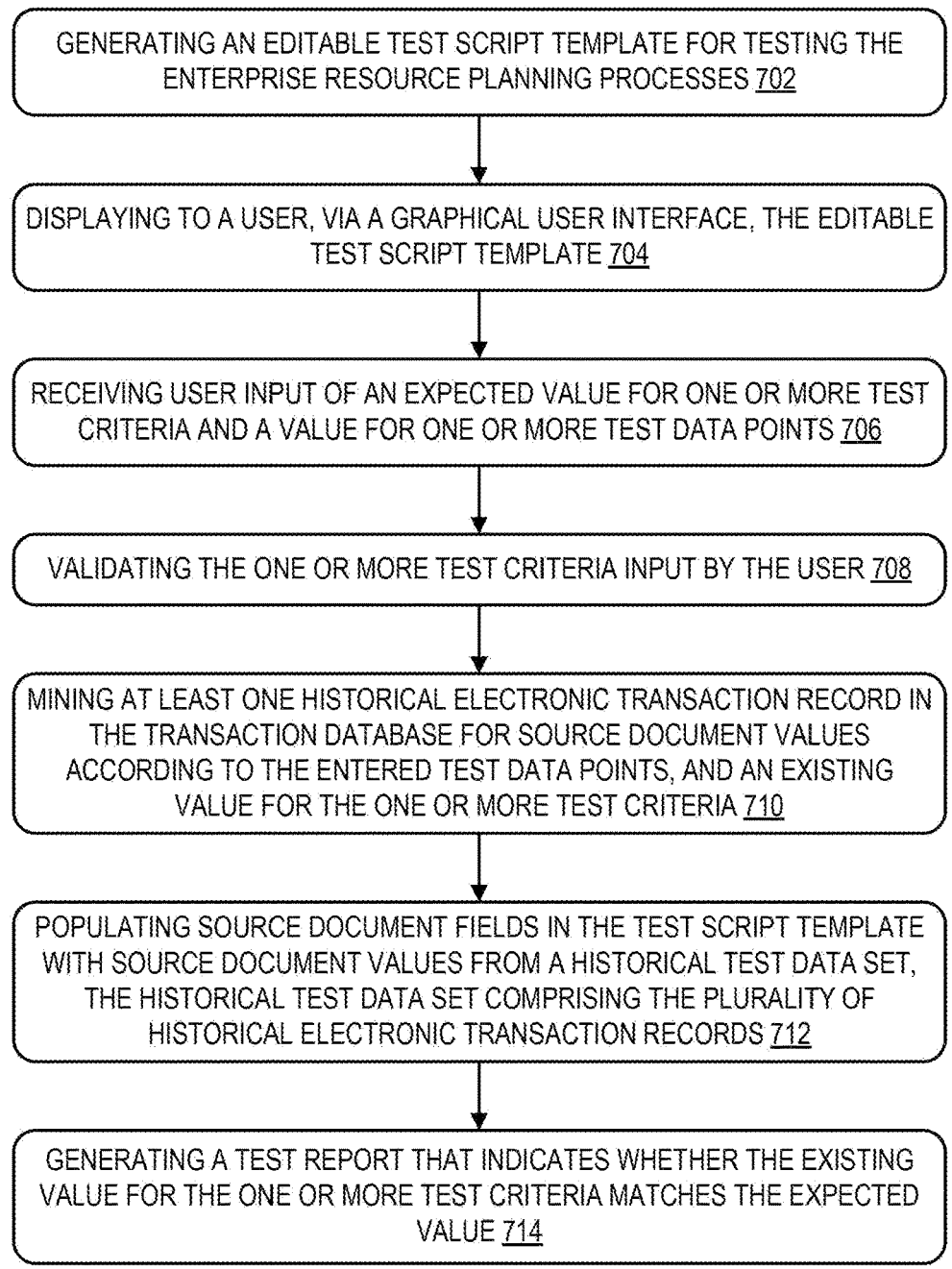
FIG. 7 shows a flow diagram of a method for automated testing of enterprise resource planning processes according to one example of the present disclosure.

FIG. 7 shows a flow diagram of an example method 700 for automated testing of enterprise resource planning processes. Method 700 is preferably implemented by at least one processor of a client computing device that includes an ERP system, and that is in communication with a server computing device, such as the computing system 100 described herein.

At step 702, the method 700 may include, generating an editable test script template for testing the enterprise resource planning processes. The editable test script template may have a plurality of test fields, including test fields for test criteria for evaluation and test fields for test data points. Continuing from step 702 to step 704, the method 700 may include displaying to a user, via a graphical user interface, the editable test script template.

Proceeding from step 704 to step 706, the method 700 may include receiving user input of an expected value for one or more test criteria and a value for one or more test data points. The one or more test criteria is one of taxability, tax rate, tax code, and tax jurisdiction code. Advancing from step 706 to step 708, the method 700 may include validating the one or more test criteria input by the user.

Proceeding from step 708 to step 710, the method 700 may include identifying at least one historical electronic transaction record in the transaction database that contains source document values according to the entered test data points, and an existing value for the one or more test criteria. In some implementations, the identified at least one historical electronic transaction record is one of a plurality of historical electronic transaction records stored at the transaction database, and each of the plurality of historical electronic transaction records contains source document values according to the entered test data points, and an existing value for the one or more test criteria. In some implementations, the source document values are identified via data mining. Data mining rules included in data mining logic may be executed to mine the at least one historical electronic transaction record and/or the historical test data set, and the mined data is used to generate test data points to populate the test script template. In some implementations, the source document values in the at least one historical transaction record do not match the entered test data points. In this implementation, the at least one historical transaction record that includes source document values that best match the entered test data points is identified, and master data and configurations that have the desired attributes are identified and validated in other historical electronic transaction records in the historical test data set and used to complete population of the editable test script template with source document values.

Advancing from step 710 to step 712, the method 700 may include populating the test script template with the source document values and the existing value for the one or more test criteria from the identified at least one historical electronic transaction record. In some implementations, the method may include populating source document fields in the test script template with source document values from a historical test data set, the historical test data set comprising the plurality of historical electronic transaction records.

Continuing from step 712 to step 714, the method 700 may include generating a test report that indicates whether the existing value for the one or more test criteria matches the expected value. When the existing value is different from the expected value for the one or more test criteria, the method may further include receiving user input to correct the existing value for the one or more test criteria. In response to receiving user input to correct the existing value for the one or more test criteria, the method may further include verifying the corrected existing value for the one or more test criteria matches the expected value and creating test documents based on the verified test script. The test documents may be created in different modes to simulate at least one of manually entered documents, business application programming interface documents, intermediate documents, and collective billing documents. The method may further include creating a record of each action from receiving user input of an expected value for the one or more test criteria to creating test documents based on the verified test script, and indicating in the record whether each action was successful.

Using the above-described systems and methods can reduce the amount of time and money required for clients to manually test ERP processes. Conventional solutions for implementing or upgrading an ERP system typically rely on manually defining a test scenario, collecting data required to create a successful transaction, creating the purchase order, goods receipt, invoice verification, sales order, delivery, goods issue, billing, and credit/debit memo documents, and reviewing each of the resulting test documents to compare actual and expected results, including tax values, all of which may be very time-consuming, not to mention error-prone. Insufficient testing (based on time and user constraints) can lead to inaccurate processing of business transactions that involve indirect taxes, thereby exposing the client to potential legal action. The architecture described herein has the technical advantages of automating testing ERP processes with minimal input required from the client, and increasing accuracy by collecting data from a growing pool of historical electronic transactions. Clients are additionally spared the burden of deciphering and updating tax rates and rules in various jurisdictions.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
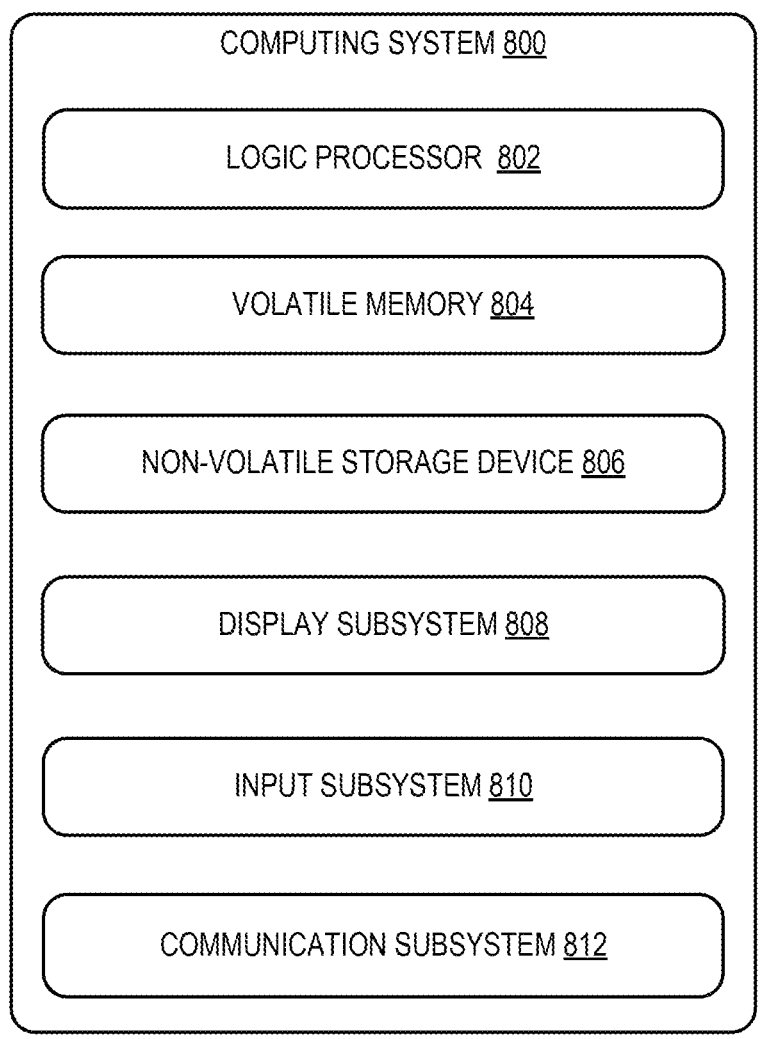
FIG. 8 shows a schematic view of an example computing environment in which the computer system of FIG. 1 may be enacted.

FIG. 8 schematically shows a non-limiting embodiment of a computing system 800 that can enact one or more of the methods and processes described above. Computing system 800 is shown in simplified form. Computing system 800 may embody the computing device 10 described above and illustrated in FIG. 1. Computing system 800 may take the form of one or more personal computers, server computers, mobile computing devices (e.g., laptop, smart phone, or tablet computer), and/or other computing devices.

Computing system 800 includes a logic processor 802 volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed, e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 typically implemented in software by a processor to perform a particular function using portions of volatile memory, which function involves transformative processing that specially configures the processor to perform the function. Thus, a module, program, or engine may be instantiated via logic processor 802 executing instructions held by non-volatile storage device 806, using portions of volatile memory 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, or touch screen.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for automated testing of enterprise resource planning processes, comprising:
 a computing device including a display;
 a transaction database including at least one historical electronic transaction record; and
 one or more processors configured to execute a testing program using portions of associated memory to:
  generate an editable test script template for testing the enterprise resource planning processes, the editable test script template having a plurality of test fields, including test fields for test criteria related to taxation and test fields for test data points related to a company or product;
  display to a user, via a graphical user interface, the editable test script template;
  receive user input of an expected value for one or more test criteria and a known value for one or more test data points;
  validate the one or more test criteria input by the user;
  identify at least one historical electronic transaction record in the transaction database that contains one or more source document values that match the user-input known value for the one or more test data points, and an existing historical value for the one or more test criteria;
  populate the test script template with the one or more source document values and the existing historical value from the identified at least one historical electronic transaction record; and
  generate a test report that indicates whether the existing historical value matches the user-input expected value for the one or more test criteria.

2. The computing system of claim 1, wherein
 the identified at least one historical electronic transaction record is one of a plurality of historical electronic transaction records stored at the transaction database,
 each of the plurality of historical electronic transaction records contains one or more source document values that match the user-input known value for the one or more test data points, and
 the test script template is populated with source document values from a historical test data set, the historical test data set comprising the plurality of historical electronic transaction records.

3. The computing system of claim 1, wherein
 the one or more processors are further configured to receive user input to correct the existing historical value for the one or more test criteria when the existing historical value is different from the user-input expected value for the one or more test criteria.

4. The computing system of claim 3, wherein
 in response to receiving user input to correct the existing historical value for the one or more test criteria, the one or more processors are further configured to verify the corrected historical existing value for one or more test criteria matches the user-input expected value.

5. The computing system of claim 4, wherein
the one or more processors are further configured to create test documents based on the verified test script.

6. The computing system of claim 5, wherein
the test documents are created in different modes to simulate at least one of manually entered documents, business application programming interface documents, intermediate documents, and collective billing documents.

7. The computing system of claim 5, wherein
the one or more processors are further configured to generate a system messages log that captures system messages during execution of various stages of the test program, from receiving user input in the editable test script template to creating test documents based on the verified test script; and
indicate in the system messages log whether each stage was successfully executed.

8. The computing system of claim 1, wherein
the one or more test criteria is one of taxability, tax rate, tax code, and tax jurisdiction code.

9. The computing system of claim 1, wherein
the one or more processors are further configured to generate data including the one or more source document values that match the user-input known value for the one or more test data points, and the existing historical value for the one or more test criteria when the at least one historical electronic transaction record lacks sufficient data to populate the source document values.

10. The computing system of claim 9, wherein
the generated data is stored at the transaction database.

11. A method for automated testing of enterprise resource planning processes, the method comprising:
generating an editable test script template for testing the enterprise resource planning processes, the editable test script template having a plurality of test fields, including test fields for test criteria related to taxation and test fields for test data points related to a company or product;
displaying to a user, via a graphical user interface, the editable test script template;
receiving user input of an expected value for one or more test criteria and a known value for one or more test data points;
validating the one or more test criteria input by the user;
identifying at least one historical electronic transaction record in the transaction database that contains one or more source document values that match the user-input known value for the one or more test data points, and an existing historical value for the one or more test criteria;
populating the test script template with the one or more source document values and the existing historical value from the identified at least one historical electronic transaction record; and
generating a test report that indicates whether the existing historical value matches the expected value for the one or more test criteria.

12. The method of claim 11, wherein
the identified at least one historical electronic transaction record is one of a plurality of historical electronic transaction records stored at the transaction database, each of the plurality of historical electronic transaction records contains one or more source document values that match the user-input known value for the one or more test data points, and the method further comprises:
populating the test script template with source document values from a historical test data set, the historical test data set comprising the plurality of historical electronic transaction records.

13. The method of claim 11, the method further comprising:
receiving user input to correct the existing historical value for the one or more test criteria when the existing historical value is different from the user-input expected value for the one or more test criteria.

14. The method of claim 13, the method further comprising:
in response to receiving user input to correct the existing historical value for the one or more test criteria, verifying the corrected existing historical value for the one or more test criteria matches the user-input expected value.

15. The method of claim 14, the method further comprising:
creating test documents based on the verified test script.

16. The method of claim 15, the method further comprising:
creating the test documents in different modes to simulate at least one of manually entered documents, business application programming interface documents, intermediate documents, and collective billing documents.

17. The method of claim 15, the method further comprising:
generating a system messages log that captures system messages during execution of various stages of the test program, from receiving user input in the editable test script template to creating test documents based on the verified test script; and
indicating in the system messages log whether each stage was successfully executed.

18. The method of claim 11, wherein
the one or more test criteria is one of taxability, tax rate, tax code, and tax jurisdiction code.

19. The method of claim 11, the method further comprising:
generating data including the one or more source document values that match the user-input known value for the one or more test data points, and the existing historical value for the one or more test criteria when the at least one historical electronic transaction record lacks sufficient data to populate the source document values.

20. A computing system for automated testing of enterprise resource planning processes, comprising:
a computing device including a display;
a transaction database including at least one historical electronic transaction record;
one or more processors configured to execute a testing program using portions of associated memory to:
generate an editable test script template for testing the enterprise resource planning processes, the editable test script template having a plurality of test fields, including test fields for test criteria related to taxation and test fields for test data points related to a company or product;
display to a user, via a graphical user interface, the editable test script template;
receive user input of an expected value for one or more test criteria and a known value for one or more test data points;

validate of the one or more test criteria input by the user;

identify at least one historical electronic transaction record in the transaction database that contains one or more source document values that match the user-input known value for the one or more test data points, and an existing historical value for the one or more test criteria;

populate the test script template with the one or more source document values and the existing historical value from the identified at least one historical electronic transaction record; and generate a test report that indicates whether the existing historical value matches the user-input expected value for the one or more test criteria;

receive verification that the test script template is accurate; and create test documents based on the verified test script, wherein the test documents include at least one of a purchase order, financial accounting invoice, and sales order, and the test documents are created in different modes to simulate at least one of manually entered documents, business application programming interface documents, intermediate documents, and collective billing documents.

\* \* \* \* \*